(12) United States Patent
Zou

(10) Patent No.: US 9,370,020 B2
(45) Date of Patent: Jun. 14, 2016

(54) METHODS AND SYSTEMS FOR SCHEDULING COMMUNICATIONS IN A CO-CHANNEL NETWORK

(71) Applicant: Alcatel-Lucent USA Inc., Murray Hill, NJ (US)

(72) Inventor: Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 134 days.

(21) Appl. No.: 13/895,408

(22) Filed: May 16, 2013

(65) Prior Publication Data

US 2014/0342748 A1     Nov. 20, 2014

(51) Int. Cl.
*H04W 72/12* (2009.01)
*H04W 72/04* (2009.01)
*H04W 28/16* (2009.01)
*H04W 84/04* (2009.01)
*H04W 92/20* (2009.01)

(52) U.S. Cl.
CPC .......... *H04W 72/1278* (2013.01); *H04W 28/16* (2013.01); *H04W 72/0426* (2013.01); *H04W 84/045* (2013.01); *H04W 92/20* (2013.01)

(58) Field of Classification Search
CPC ... H04W 84/045; H04W 8/082; H04W 16/06; H04W 16/10; H04W 16/14; H04W 28/0268; H04W 36/04; H04W 48/16; H04W 48/17; H04W 64/00; H04W 72/0406; H04W 76/02; H04W 76/04; H04W 76/06; H04W 80/04
See application file for complete search history.

(56) References Cited

U.S. PATENT DOCUMENTS

| 2010/0067604 A1 | 3/2010 | Bhadra et al. | |
| 2014/0349659 A1* | 11/2014 | Ishii | H04W 8/082 |
| | | | 455/444 |

FOREIGN PATENT DOCUMENTS

| EP | 2180739 A1 | 4/2010 |
| EP | 2426829 A1 | 3/2012 |
| EP | 2533595 A1 | 12/2012 |
| WO | WO-2013040070 A1 | 3/2013 |

OTHER PUBLICATIONS

International Search Report and Written Opinion dated Sep. 10, 2014.
Ishii, H. et al., "A Novel Architecture for LTE-B: C-plane/U-plane split and Phantom Cell concept," Globecom Workshops, pp. 624-630, Dec. 3, 2012.
"New Study Item Description: Small Cell enhancements for E-UTRA and E-UTRAN—Higher-layer aspects". 3GPP TSG-RAN Meeting#58; Barcelona, Spain; Dec. 2012.

* cited by examiner

*Primary Examiner* — Chuong A Ngo
(74) *Attorney, Agent, or Firm* — Harness, Dickey & Pierce, P.L.C.

(57) ABSTRACT

At least one example embodiment discloses a method of scheduling communications for a user equipment (UE) in a co-channel heterogeneous network having a macro cell base station and a small cell base station. The method includes obtaining, by the macro cell base station, pre-scheduling information for transmissions to the UE based on measurements from the UE, the obtaining including, allocating resource blocks for the transmissions, the transmissions to the UE being from at least one of the macro cell base station and the small cell base station, and transmitting, by the macro cell base station, the pre-scheduling information to the small cell base station, the pre-scheduling information indicating first resource blocks for first transmissions from the macro cell base station and second resource blocks for second transmissions from the small cell base stations.

21 Claims, 10 Drawing Sheets

RLC ARQ operations in dual connectivity mode

METHODS AND SYSTEMS FOR SCHEDULING COMMUNICATIONS IN A CO-CHANNEL NETWORK

BACKGROUND

Heterogeneous networks (HetNets or HTNs) are now being developed wherein cells of smaller size are embedded within the coverage area of larger macro cells and the small cells could even share the same carrier frequency with the umbrella macro cell, primarily to provide increased capacity in targeted areas of data traffic concentration. Such heterogeneous networks try to exploit the spatial distribution of users (and traffic) to efficiently increase the overall capacity of the wireless network. Those smaller-sized cells are typically referred to as pico cells or femto cells, and for purposes of the description herein will be collectively referred to as small cells. Such heterogeneous networks try to exploit the spatial variations in user (and traffic) distribution to efficiently increase the overall capacity of the wireless network.

In a co-channel network, an umbrella macro cell and the overlaid pico cell(s) share the same carrier frequency, the inter-cell interference between macro and pico cells becomes a challenging issue in HetNets. The inter-cell interference affects its coverage area and the effective offload capability of a small cell. The inter-cell interference may cause of the UE handover failures and mobility performance degradation.

Such deployments present some specific interference scenarios for which enhanced inter-cell interference coordination (eICIC) techniques would prove beneficial.

In one scenario, the small cells are pico cells, which are open to users of the macro cellular network. In order to ensure that such pico cells carry a useful share of the total traffic load, user equipments (UEs) may be programmed to associate preferentially with the pico cells rather than the macro cells, for example by biasing the received signal power of the Common Reference Symbol (CRS), a quantity that may be referred to as reference signal received power (RSRP), such that UEs that are not too close to a pico cell will associate with the pico cell. Despite the association, UEs in pico range extension area or near the edge of a pico cell's coverage area will suffer strong interference from one or more macro cells. In order to alleviate such interference, some subframes may be configured as "almost blank" in the macro cell. An "almost blank" subframe is a subframe with reduced transmit power (e.g., reduced from a maximum transmit power) and/or a reduced activity subframe (e.g., contains only control information as compared to a fully loaded subframe). Legacy UEs (also called terminals) expect to find the reference signals for measurements but are unaware of the configuration of these special subframes.

SUMMARY

Currently, co-channel HetNets rely on eICIC. EICIC based on ABS is not very efficient. Within the ABS frames, not all the resources are used by the border UEs of the other cell. With a large number of moving UEs in an area with multiple macro and pico cells, configuring ABS dynamically in conjunction with cell range extension (CRE) is also very challenging. ABS is not tailored for individual UEs. Dynamically adjusting common ABS is difficult for every individual UE.

At least one example embodiment discloses joint scheduling of communications between a macro cell and pico cell within the macro cell. As a result, a UE in the pico cell range extended area or pico/macro cell border area will not suffer the intercell interference and cross stream interference when multi-streaming with both macro and pico cells are enabled.

An example embodiment discloses a method of scheduling communications for a user equipment (UE) in a co-channel heterogeneous network having a macro cell base station and a small cell base station. The method includes obtaining, by the macro cell base station, pre-scheduling information for transmissions to the UE based on measurements from the UE, the obtaining including, allocating resource blocks for the transmissions, the transmissions to the UE being from at least one of the macro cell base station and the small cell base station, and transmitting, by the macro cell base station, the pre-scheduling information to the small cell base station, the pre-scheduling information indicating first resource blocks for first transmissions from the macro cell base station and second resource blocks for second transmissions from the small cell base stations. The measurements may include a location of the UE and channel conditions between the UE and the macro cell base station and channel conditions between the UE and the small cell base station.

In an example embodiment, the method further includes receiving, by the macro cell base station, data for the UE, splitting the data into first and second data streams, transmitting the second data stream to the small cell base station, and transmitting the first data stream to the UE based on the pre-scheduling information.

In an example embodiment, the splitting splits the data based on at least one of a channel condition, buffer condition, loading of the macro and small cell base stations, a location of the UE, a speed of the UE and data rate and allocates a first portion of the data to the first data stream and a second portion of the data to the second data stream based on the channel condition, buffer condition and data rate.

In an example embodiment, the splitting includes determining an order of the first transmissions from the macro cell base station and the second transmissions from the small cell base stations.

In an example embodiment, the method further includes generating, by the macro cell base station, controlling and the pre-scheduling information, splitting the controlling and the pre-scheduling information into first and second control streams, transmitting the second control stream to the small cell base station, and transmitting the first control stream to the UE based on the pre-scheduling information.

In an example embodiment, the method further includes generating, by the macro cell base station, controlling and the pre-scheduling information, splitting the controlling and the pre-scheduling information into first and second streams, transmitting the second stream to the small cell base station, and transmitting the first stream to the UE based on the pre-scheduling information.

In an example embodiment, the method further includes scheduling the first transmissions based on the pre-scheduling information and conditions of a channel between the UE and the macro cell base station.

In an example embodiment, the method further includes receiving, by the macro cell base station, data for the UE, and transmitting at least most of the data to the small cell base station based on a measurement of a small cell reference signal reported by the UE.

In an example embodiment, the method further includes receiving, by the macro cell base station, signaling information, and transmitting the signaling information to the small cell base station when the location of the UE is in the central area of the small cell.

In an example embodiment, the method further includes receiving, by the macro cell base station, a first data stream for the UE based on a first link measurement of a first link between the UE and the macro cell base station and a second link measurement of a second link between the UE and the small cell base station.

In an example embodiment, the method further includes transmitting, by the macro cell base station, the first data stream for the UE in coordination with a second data stream from the small cell base station based on the pre-scheduling information.

In an example embodiment, the method further includes receiving one of an acknowledgement and negative acknowledgement from the UE over an uplink channel, the uplink channel being used by the macro cell base station and the small cell base station to receive information from the UE.

In an example embodiment, the method further includes retransmitting the first data in response to a negative acknowledgement using one of the first resource blocks.

In an example embodiment, the method further includes blocking transmissions in the second resource blocks.

In an example embodiment, the obtaining obtains the pre-scheduling information based on a backhaul delay between the macro cell base station and the small cell base station and an information processing delay of the small cell base station.

Another example embodiment discloses a method of scheduling communications for a user equipment (UE) in a co-channel heterogeneous network having a macro cell base station and a small cell base station. The method includes receiving, by the small cell base station, pre-scheduling information from the macro cell base station, the pre-scheduling information indicating first resource blocks for first transmissions from the macro cell base station and second resource blocks for second transmissions from the small cell base stations.

In an example embodiment, the method further includes receiving, by the small cell base station, signaling information from the macro cell base station, and transmitting the signaling information to the UE based on the pre-scheduling information.

In an example embodiment, the method further includes receiving, by the small cell base station, data for the UE from the macro cell base station, and transmitting the data to the UE based on the pre-scheduling information.

In an example embodiment, the transmitting is based on a delay allowed for the small cell base station to processing the received pre-scheduling information over the backhaul.

In an example embodiment, the method further includes receiving one of an acknowledgement and negative acknowledgement from the UE over a channel, the channel being used by the macro cell base station to receive responses from the UE.

In an example embodiment, the method further includes transmitting a response to the one of the acknowledgement and negative acknowledgement using one of the second resource blocks.

In an example embodiment, the method further includes receiving, by the small cell base station, data for the UE from a serving gateway of the network, and transmitting the data to the UE based on the pre-scheduling information.

In an example embodiment, the method further includes blocking transmissions in the first resource blocks.

BRIEF DESCRIPTION OF THE DRAWINGS

Example embodiments will be more clearly understood from the following detailed description taken in conjunction with the accompanying drawings. FIGS. 1-10B represent non-limiting, example embodiments as described herein.

FIG. 1 illustrates a wireless communication system according to an example embodiment;

FIG. 2 illustrates a macro cell shown in FIG. 1;

FIG. 3 illustrates border areas of cells shown in FIG. 1;

FIG. 6 illustrates an example embodiment of joint scheduling with resource reservation;

FIG. 7 illustrates a timing diagram of hybrid automatic repeat request (HARQ) according to an example embodiment;

FIG. 8 illustrates a timing diagram of radio link control (RLC) automatic repeat request (ARQ) according to an example embodiment;

FIG. 10B illustrates an example embodiment of a base station shown in FIG. 1.

DETAILED DESCRIPTION

Figure 1:
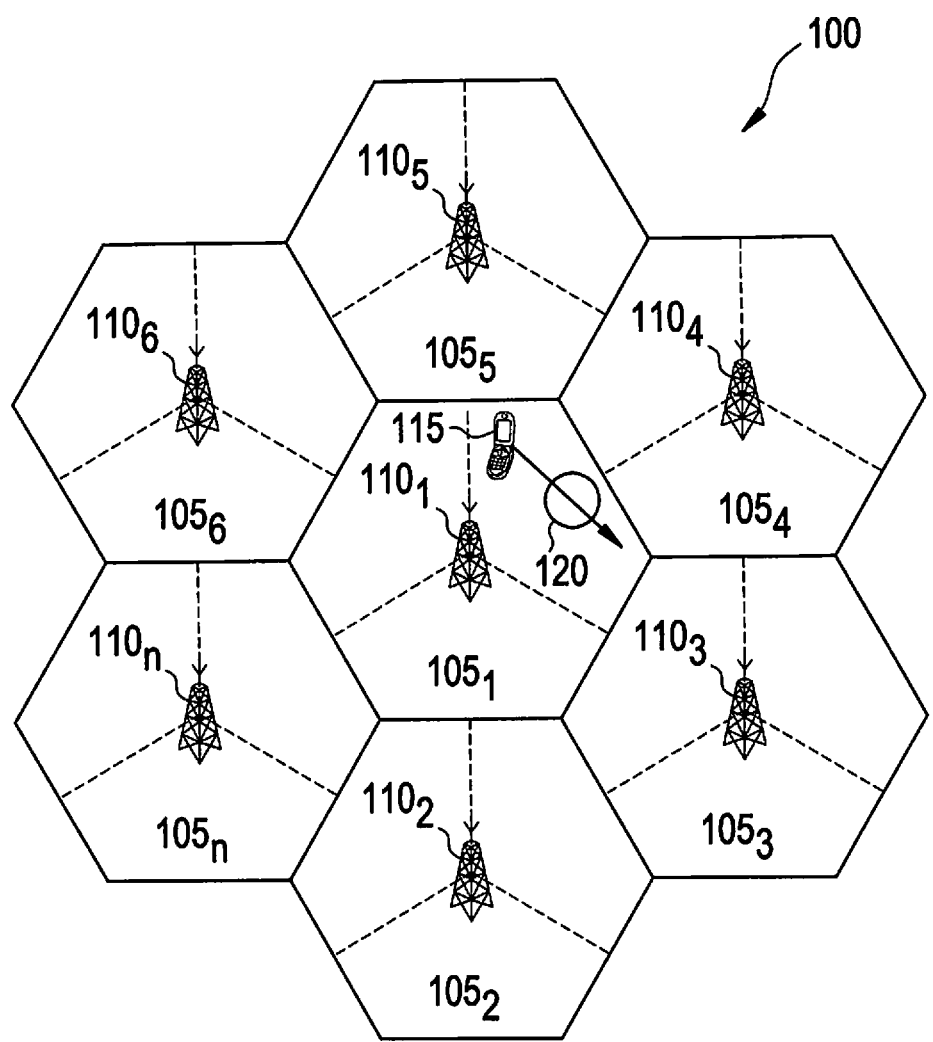

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

In order to make use of almost blank subframes (ABSs) effective, signaling is provided from the macro cell to the pico cell across the corresponding backhaul interface, known in LTE as the "X2" interface between the cells. For LTE Release 10, it has been agreed that this X2 signaling will take the form of a coordination bitmap to indicate the ABS pattern (for example with each bit corresponding to one subframe in a series of subframes, with the value of the bit indicating whether the subframe is an ABS or not). Such signaling can help the pico cell to schedule data transmissions in the pico cell appropriately to avoid interference (e.g. by scheduling transmissions to UEs near the edge of the pico cell during ABSs), and to signal to the UEs the subframes which should have low macro cellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

EICIC is an interference mitigation technique that involves the transmission of ABS from a macro cluster. During the transmission of ABS, only a subset of the broadcast channels is transmitted while PDSCH is muted. This allows underlaid small cells such as metro cells, femto cells and relays to transmit to the UEs that have selected those nodes with a better SINR.

Since Long Term Evolution (LTE) is a co-channel deployment (i.e., it has 1:1 frequency re-use in the different cells) and all the uplink and downlink traffic are scheduled by the base station via a downlink control channel (PDCCH), the edge users' downlink performance can be impaired due to interference received from neighboring cells that use the same frequency due to 1:1 re-use.

Within the ABS frames, not all the resources are used by the border UEs of the other cell. With a large number of moving UEs in an area with multiple macro and pico cells, configuring ABS dynamically in conjunction with cell range extension (CRE) is also very challenging. ABS is not tailored for individual UEs. Dynamic adjusting common ABS is hard for every individual UEs.

At least one example embodiment discloses a method and system for joint scheduling of communications between a macro cell and pico cells within the macro cell.

For UEs in a pico/macro border area or a pico's range extended area, a macro eNB pre-schedules resource blocks for future co-channel dual connectivity transmissions at either macro cell only, pico cell only, or both macro and pico cells. When dual connectivity is allowed, the control plane and data plane could be from different or multiple base stations simultaneously.

After a latency for backhaul to deliver the pre-scheduling information to the pico cell, both macro and pico eNBs perform coordinated and timing aligned real time scheduling and data transmission based on the macro eNB pre-scheduled resource blocks (RBs).

As a result, both a macro cell scheduler and a pico cell scheduler know the resource blocks occupied for the dual connectivity transmissions; not only the resource blocks scheduled by itself but also the resource blocks scheduled by the other scheduler. After the joint scheduling, there is no resource block (RB) collision or interference from the other cell for the dual connectivity or multi-streaming transmissions which will have the same experience as if they are transmitted in a single cell.

In a multi-streaming embodiment, transmissions from the macro base station and pico base station are coordinated and synchronized. The data segments streamed for transmission to the UE are split in a time division multiplex fashion between the macro and pico cells. Therefore, cross stream interference can be reduced/avoided. The overlap (or collision) of the feedback (ACK/NAK) from the UE to both macro and pico base stations can also be reduced/avoided.

FIG. 1 illustrates a wireless communication system according to an example embodiment. Referring to FIG. 1, the wireless communication system includes a heterogeneous network 100 (HetNet), where cells of smaller footprint size (e.g., pico cells) are embedded within the coverage area of a larger macro cell (e.g., the area served by a macro base station) or at least partially overlapped by the larger macro cell. As used herein, the terminology "cell" refers to the coverage area as well as the base station serving the coverage area. It will be understood that each cell has an associated base station.

As shown, a plurality of macro cells $105_1$-$105_n$ are arranged in a hexagonal grid of cells. ENodeBs $110_1$-$110_n$ serve the plurality of macro cells $105_1$-$105_n$, respectively. A user equipment (UE) 115 within the cell $105_1$ may communicate with the eNodeB $110_1$. Since the UE 115 is within the macro cell $105_1$, the eNodeB $110_1$ may be referred to as a serving base station.

The eNodeB $110_1$ communicates with the UE 115 (and vice versa) via at least one air interface that supports transmission of data between the eNodeB $110_1$ and the UE 115. Techniques for establishing, maintaining, and operating the air interfaces between the UE 115 and the eNodeB $110_1$ to provide uplink and/or downlink wireless communication channels (PDCCH, PDSCH, PUCCH) between the UE 115 and the eNodeB $110_1$ are known in the art and in the interest of clarity only those aspects of establishing, maintaining, and operating the air interfaces that are relevant to the present disclosure will be discussed herein.

Small cells may be overlaid in each of the macro cells $105_1$-$105_n$. Example embodiments encompass any number and type of small cell. For example, the phrase "small cell" may refer to any relatively small cell or access point, such as a femto cell, femto access point (or base station), pico cell, pico access point (or base station), micro cell, micro access point (or base station), metro cell, metro access point (or base station) nano cell, nano access point (or base station), etc.

For purposes of illustration, a small cell 120 is embedded in the coverage area of the macro cell $105_1$. The small cell 120 may be a pico cell or femto cell. However, small cells are not limited to being femto or pico cells.

Moreover, the UE 115 is travelling at a speed towards the small cell 120.

The network 100 is an LTE network. However, it should be understood that example embodiments are not limited thereto.

Figure 2:
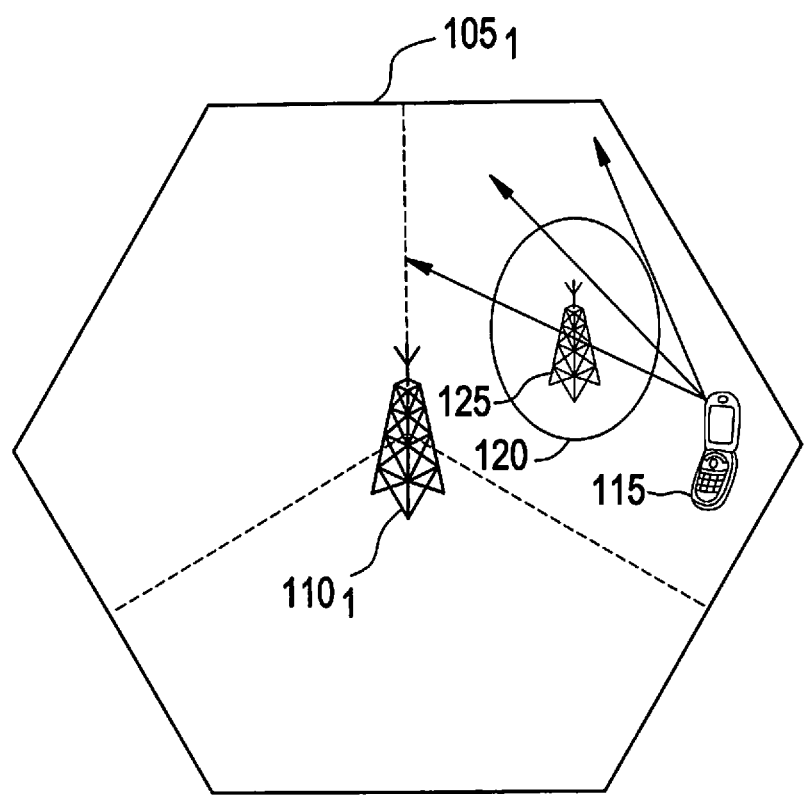

FIG. 2 illustrates the macro cell $105_1$, shown in FIG. 1. As shown, a small cell eNB 125 provides communications to equipment within the small cell 120.

Both the macro eNB $110_1$ and the small cell eNB 125 are configured to determine a speed and/or velocity of the UE 115. The small cell eNB 125 may be a pico cell base station, femto base station or any other type of small cell base station. As is known in LTE, the UE or serving base station estimates the speed of the UE based on the number of cells a UE was handed over within a period of time. Other methods are also known. UE based methods are called mobility state estimation, which is specified in standards. The serving base station could also count and maintain the accumulated number of HOs to estimate the UE speed. Other known methods of determining a speed of a UE may be used.

In an example embodiment, the network may decide that only very low speed UEs will be allowed to HO to the small cell (e.g. below 10 km/h). UEs with higher speed than medium-low will maintain a macro cell eNB as the serving base station.

Figure 3:
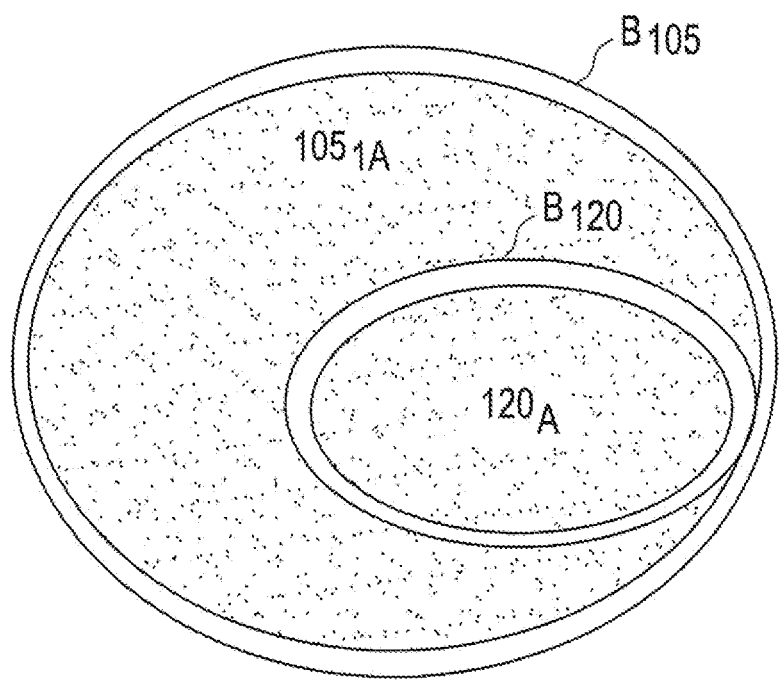

As shown in FIG. 3, a macro cell $105_{1A}$ includes a cell border $B_{105}$ and a small cell $120_A$ includes a border $B_{120}$. It should be understood that the macro cell $105_{1A}$ and the small cell $120_A$ may be the same as the macro cell $105_1$ and the small cell 120. Thus, the discussion of FIG. 3 will discuss features not previously discussed.

The border between the macro cell $105_{1A}$ and the small cell $120_A$ is in terms of the relative power measurement at the coverage area. Without small cell range extension, if at a certain coverage area, the measured power from the macro cell $105_{1A}$ and the small cell $120_A$ are the same or close, the coverage area is at the border of to two cells. The macro cell $105_{1A}$ and the small cell $120_A$ configure the UEs to determine the boarder border $B_{120}$ based on the measured powers received from the macro cell $105_{1A}$ and the small cell $120_A$.

When a UE moves into the area $120_A$ of the small cell, if the UE is very slow, the macro cell eNB may perform a HO to the small cell eNB. If the UE is not very slow, the macro cell eNB maintains connectivity with the UE and schedules data to be 100% with the small cell eNB with support of backhaul between the macro and small cell eNBs and a radio link between the UE and the small cell eNB.

Radio Resource Control (RRC) control signaling and signaling support small cell eNB local scheduling will be delivered from the macro cell eNB to small cell eNB via an X2 interface. In an example embodiment, the data could be from macro cell eNB or from a serving gateway.

System Architecture for Joint Scheduling

Figure 4A:
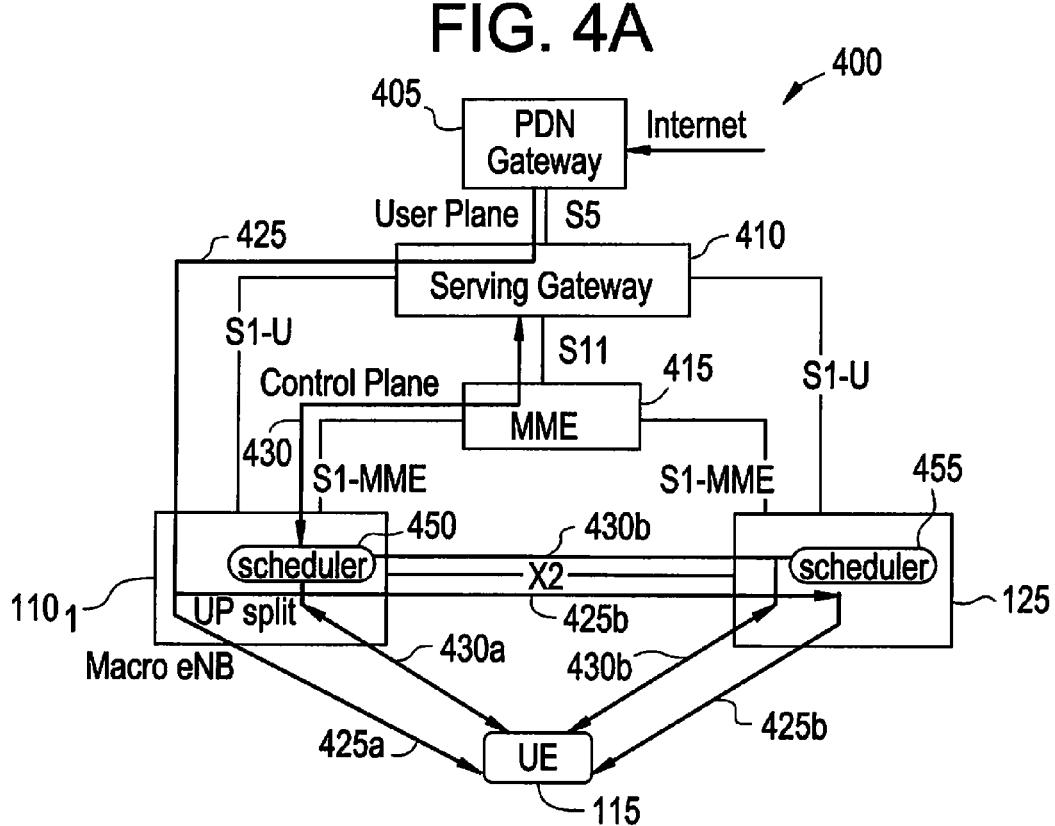
FIGS. 4A and 4B illustrate a system for joint scheduling according to an example embodiment.
Figure 4B:
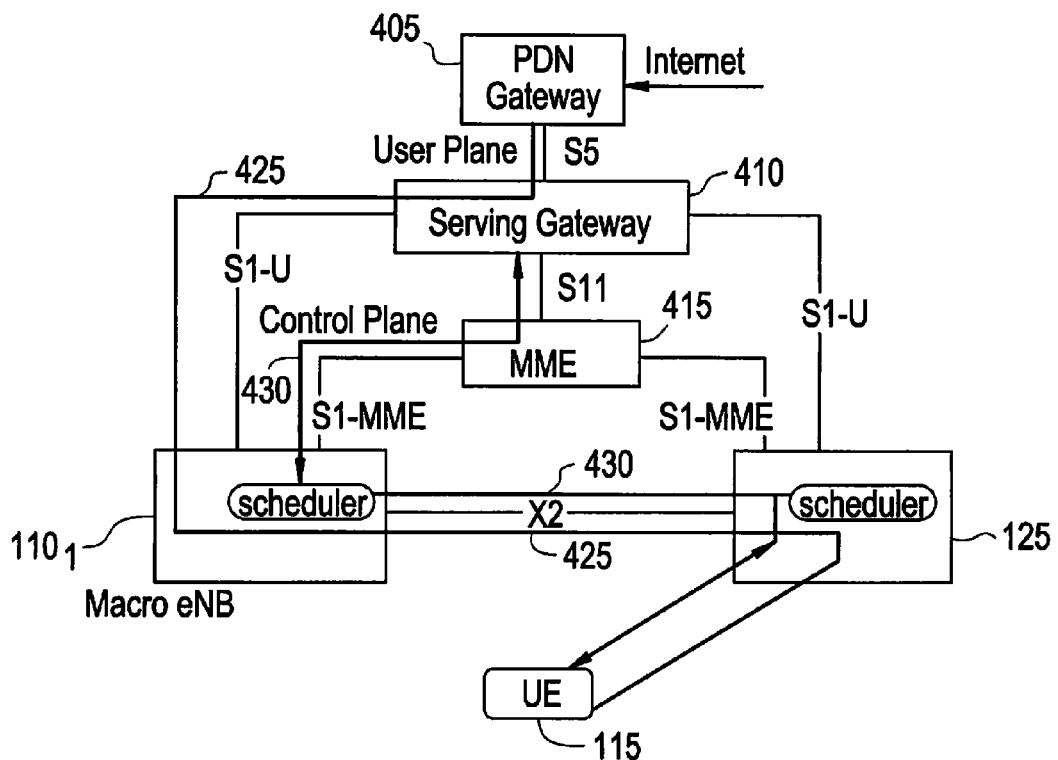
Figure 5A:
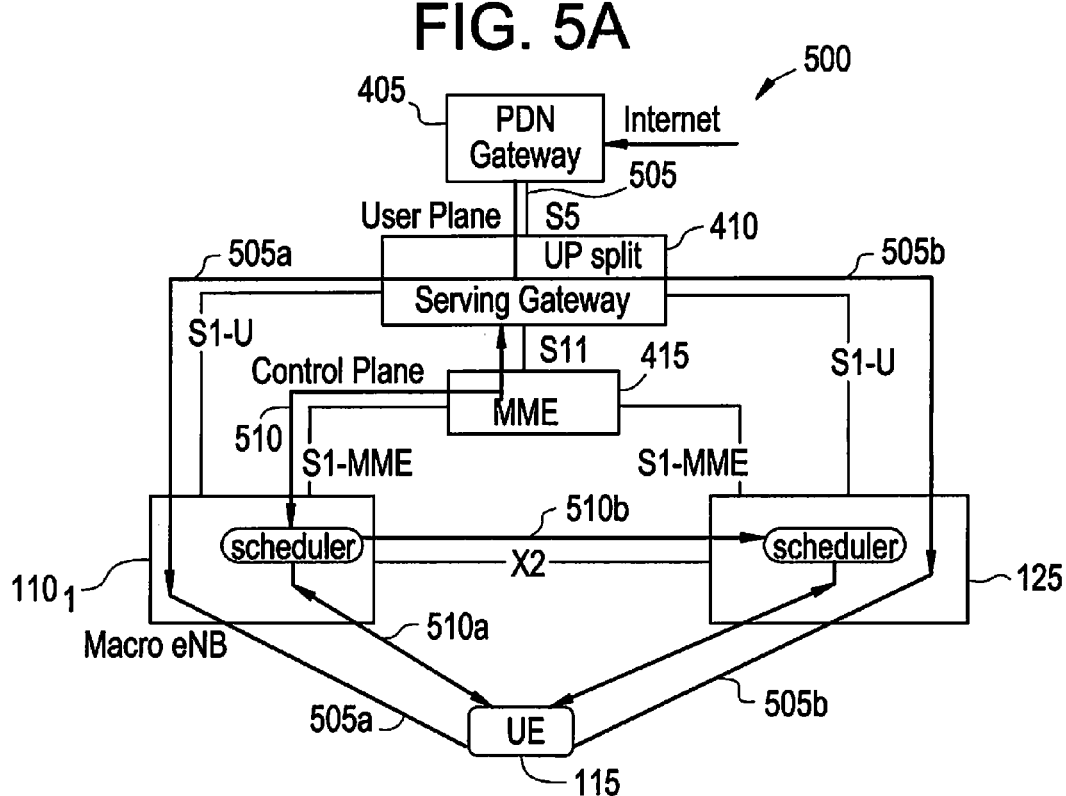
FIGS. 5A and 5B illustrate a system for joint scheduling according to another example embodiment.
Figure 5B:
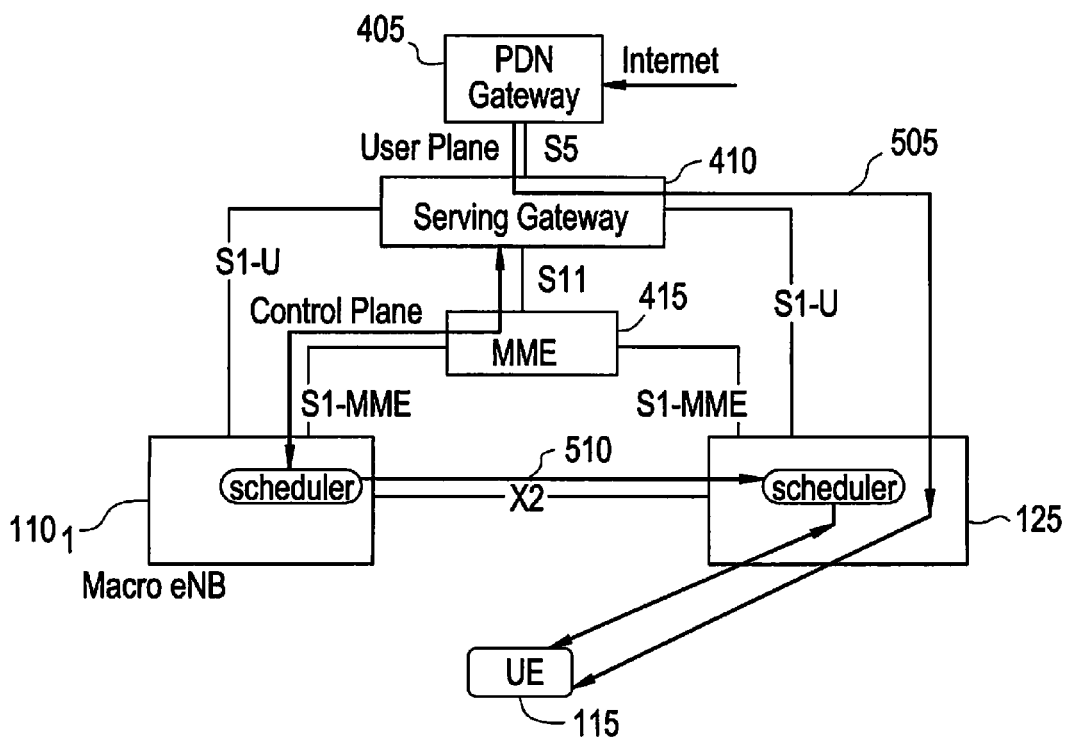

FIGS. 4A and 4B illustrate a system for joint scheduling according to an example embodiment. FIGS. 5A and 5B illustrate a system for joint scheduling according to another example embodiment.

FIG. 4A illustrates joint scheduling when a UE is at a cell border area (e.g., border $B_{120}$). FIG. 4B illustrates joint scheduling when a UE is at a central area of the small cell (e.g., $120_A$).

As shown in FIG. 4A, a system 400 includes a packet data network (PDN) gateway (PGW) 405, a serving gateway 410, a mobility management entity (MME) 415, the macro eNB $110_1$, the small cell eNB 125 and the UE 115. Further, the system 400 may include other elements of an LTE core network and the system 400 is not limited to the features shown in FIG. 4A.

The PDN gateway 405 is communicatively connected to the serving gateway 410 through an S5 interface, which is a known interface defined by LTE standards.

The SGW 410 and the MME 415 may be connected to the through an S11 interface, which is a known interface defined by LTE standards.

The MME 415 is connected to the macro eNB $110_1$ and the small cell eNB 125 via respective S1-MME interfaces, which is a known interface defined by LTE standards. The MME 415 manages network operations including handling the establishment of connections between UEs and a core network via eNBs, and the handling of tracking and paging for idle UEs, for example, idle UEs camping on one of the cells of the macro eNB 110 or the small cell eNB 125.

The SGW 410 is connected to the eNBs $110_1$, 125 through respective S1-U interfaces.

Further, the macro eNB $110_1$ and the small cell eNB 125 are communicatively connected to each other through an X2 interface. As shown, the macro eNB $110_1$ includes a scheduler 450 and the small cell eNB 125 includes a scheduler 455.

As shown in FIG. 4A, a user plane 425, including a data stream, exists from the PDN Gateway 405, through the serving gateway 410 and to the macro eNB $110_1$. The MME 415 decides whether the user plane 425 is anchored at the macro eNB $110_1$. For example, the MME 415 may decide whether the user plane 425 is anchored at the macro eNB $110_1$ based on information of the UE 115 (e.g., the speed of the UE, the location of the UE and the measurement report of the UE) and the system 400 (e.g., load and buffer status). A control plane (Radio Resource Management (RRM)/Radio Resource Control (RRC)) 430 exists from the MME 415 to the macro eNB 110. There is also control signaling from MME 415 to the serving gateway 410.

The control plane 430 includes the RRM mechanism between the MME 415 and eNBs $110_1$, 125 and RRC between the eNBs $110_1$, 125 and UEs. The MME 415 determines whether the control plane 430 is anchored at the macro eNB $110_1$ based on the UE's information and system information (e.g., load).

The user plane 425 may be understood as communications using packet data convergence protocol (PDCP), radio link control (RLC), media access control (MAC) and physical (PHY) layers of a protocol stack. The PDCP layer is to handle the UE mobility (handover) between the cells. When the MME 415 decides that a UE stays with the macro eNB $110_1$, the MME 415 will instruct the macro eNB $110_1$ that a PDCP layer is kept in the macro eNB $110_1$. Independent RLC, MAC and PHY layers are maintained at the macro and small cell eNBs $110_1$, 125.

When the macro eNB $110_1$ determines that the UE 115 is at a macro/small cell border area based on a power measurement report and/or location information from the UE 115, the macro eNB $110_1$ splits information within the user plane 425. More specifically, the macro eNB $110_1$ splits information within the user plane 425 into two data streams 425a and 425b. A first data stream 425a is delivered to the UE 115 and a second data stream 425b is delivered to the small cell eNB 125 over the X2 interface. The second data stream 425b is then transmitted from the small cell eNB 125 to the UE 115. When data is transmitted from both the macro eNB $110_1$ and the small cell eNB 125, the macro eNB $110_1$ allocates resource blocks for the macro and small cells in a time division-multiplex fashion.

When the macro eNB $110_1$ determines that the UE 115 is at the macro/small cell border area, the macro eNB $110_1$ also splits information within the control plane 430.

The macro eNB $110_1$ splits the information within the control plane 430 including RRC signaling and schedule signaling into two flows 430a and 430b. A first control flow 430a is delivered to the UE 115 and a second control flow 430b is delivered to the small cell eNB 125 over the X2 interface. The second control flow 430b is then transmitted from the small cell eNB 125 to the UE 115.

FIG. 4B illustrates joint scheduling when the UE is at a central area of the small cell. FIG. 4B is the same as FIG. 4A, except the macro eNB $110_1$ does not split the information within the user plane 425 and does not split the information within the control plane 430. As a result, the macro eNB $110_1$ transmits all the information within the user plane 425 and all the RRC information within the control plane 430 to the small cell eNB 125. Then those data and messages will be scheduled and transmitted from the small cell eNB 125 to the UE 115. The scheduling and MAC layer control is performed by the scheduler 455 at the small cell eNB 125.

It is possible to support RRC signaling diversity (not necessarily synchronized combine). RRC diversity means the same RRC message is transmitted by more than one eNB to the same UE.

In an example embodiment, the macro eNB $110_1$ may monitor link conditions of the streams 425a, 425b, 425c and 425d. The UE 115 provides link measurements/channel quality indicators (CQI) to the macro eNB $110_1$ over the stream 430a of the control plane 430 at the air interface. The UE 115 may increase a transmit power for providing the link measurements/channel quality indicators (CQI) to the small cell eNB 125, such that the link measurements/channel quality indicators transmission may be received by the macro eNB $110_1$. The small cell eNB 125 also reports its buffer status periodically to the macro eNB $110_1$ via the backhaul X2. By monitoring the link conditions and the buffer status of the small cell eNB 125 and its buffer status, the macro eNB $110_1$ may adjust the amount of data to send to the small cell eNB 125. For example, if the link condition from the macro eNB 110₁ to the UE 115 is poor and a lot of data are buffered at the macro eNB 110₁ waiting for delivery to the UE 115, the macro eNB 110₁ may increase the amount of data to send to the small cell eNB 125.

In FIGS. 4A-4B, the macro eNB 110₁ anchors the user plane 425 and the control plane 430. Based on at least one of the location of the UE 115, the speed of the UE 115 and the received link measurements/channel quality indicators (CQI), the macro eNB 110₁ decides whether to enter or exit a dual connectivity mode, controls the percentage of user plane splitting (adjusts data to be send to the small cell eNB 125) and pre-schedules resource block allocation for both the macro eNB 110₁ and small cell eNB 125.

The schedulers 450 and 455 reside in the macro eNB 110₁ and the small cell eNB 125, respectively. The schedulers 450 and 455 conduct real time scheduling locally according to pre-reservation guidance from the macro eNB 110₁. Both the macro and small cell schedulers 450, 455 will adopt the resource blocks for associated amount of data pre-allocated by the macro scheduler 450 for real time scheduling. However, the adjustment of other scheduling parameters such as power allocation will be based on the real time channel condition and performed locally (e.g., by the scheduler 455 for the small cell eNB 125).

Both the macro eNB 110₁ and the small cell eNB 125 maintain an RLC layer and the layers below.

FIGS. 5A and 5B illustrate a system for joint scheduling according to another example embodiment. FIGS. 5A and 5B are similar to FIGS. 4A-4B, thus only the differences will be described.

As shown in FIG. 5A, a system 500 includes the packet data network (PDN) gateway (PGW) 405, the serving gateway 410, the mobility management entity (MME) 415, the macro eNB 110₁, the small cell eNB 125 and the UE 115. The arrangement of the packet data network (PDN) gateway (PGW) 405, the serving gateway 410, the mobility management entity (MME) 415, the macro eNB 110₁, the small cell eNB 125 and the UE 115, in FIGS. 5A-5B, is the same as the arrangement shown in FIGS. 4A-4B.

As shown in FIG. 5A, a user plane 505 is split into two user plane streams 505a and 505b, when the UE 115 is at a cell border area (e.g., border B₁₂₀). Data in the user plane stream 505a is transmitted to the macro eNB 110₁ and data in the user plane stream 505b is transmitted to the small cell eNB 125. The MME 415 determines whether to split a user plane 505 and notifies to the serving gateway 410. The MME 415 will determines a percentage of the data to be split to the macro eNB 110₁ and the small cell eNB 125 based on the information report from macro eNB 110₁ and the small cell eNB 125, and notifies to the serving gateway 410. The data stream split is performed at the serving gateway 410 based on the instruction from the MME 415. The reported information includes the link conditions from the macro and small cell eNBs 110₁, 125 to the UE 115, respectively, the data buffer status of the UE 115 at both the macro and small cell eNBs 110₁, 125 and the loading conditions of the macro and small cell eNBs 110₁, 125. Data in the user plane stream 505a is transmitted to the macro eNB 110₁ and data in the user plane stream 505b are then transmitted to the UE 115. A control plane (RRC) 510 exists from the MME 415 to the serving gateway 410 and from the MME 415 to the macro eNB 110₁.

When the macro eNB 110₁ determines that the UE 115 is at a macro/small cell border area, the macro eNB 110₁ splits information within the control plane 510. More specifically, the macro eNB 110₁ splits information within the control plane 510 into two streams 510a and 510b. A first stream 510a is delivered to the UE 115 and a second stream 510b is delivered to the small cell eNB 125 over the X2 interface. The second stream 510b is then transmitted from the small cell eNB 125 to the UE 115. When data is transmitted from both the macro eNB 110₁ and the small cell eNB 125, the macro eNB 110₁ schedules of resource pre-reservation for macro and pico in a time division-multiplex fashion.

FIG. 5B illustrates joint scheduling when the UE is at a central area of the small cell. FIG. 5B is the same as FIG. 5A, except the serving gateway 410 does not split the information within the user plane 505 and the macro eNB 110₁ does not split the information within the control plane 510. As a result, the serving gateway 410 transmits all the information within the user plane 505 and the macro eNB 110₁ transmits all the information within the control plane 510 to the small cell eNB 125. FIG. 5B illustrates an example where all of the user plane is delivered to the small cell eNB 125, while the system 500 is still in a dual connectivity mode.

The macro eNB 110₁ reports link information (the link information is per UE) and loading information to the MME 415 or a centralized entity co-located with MME 415 via the S1-MME interface. The enhanced MME 415 or the centralized entity determines whether to split the user plane 425. The enhanced MME 415 or the centralized entity transmits the decision to the serving gateway 410. The user plane 505 is anchored by the serving gateway 410. If the enhanced MME 415 or the centralized entity decides to split the user plane 505, the enhanced MME 415 or the centralized entity determines the percentage of the traffic split based on the link information, buffer status and loading information.

The split decision and split percentage information are transmitted by the MME 415 to the macro eNB 110₁.

The control plane 510 is anchored by the macro eNB 110₁. The macro eNB 110₁ decides whether to enter or exit the dual connectivity mode, schedules the resource pre-reservation and pre-allocation for both the macro eNB 110₁ and the small cell eNB 125.

Figure 6:
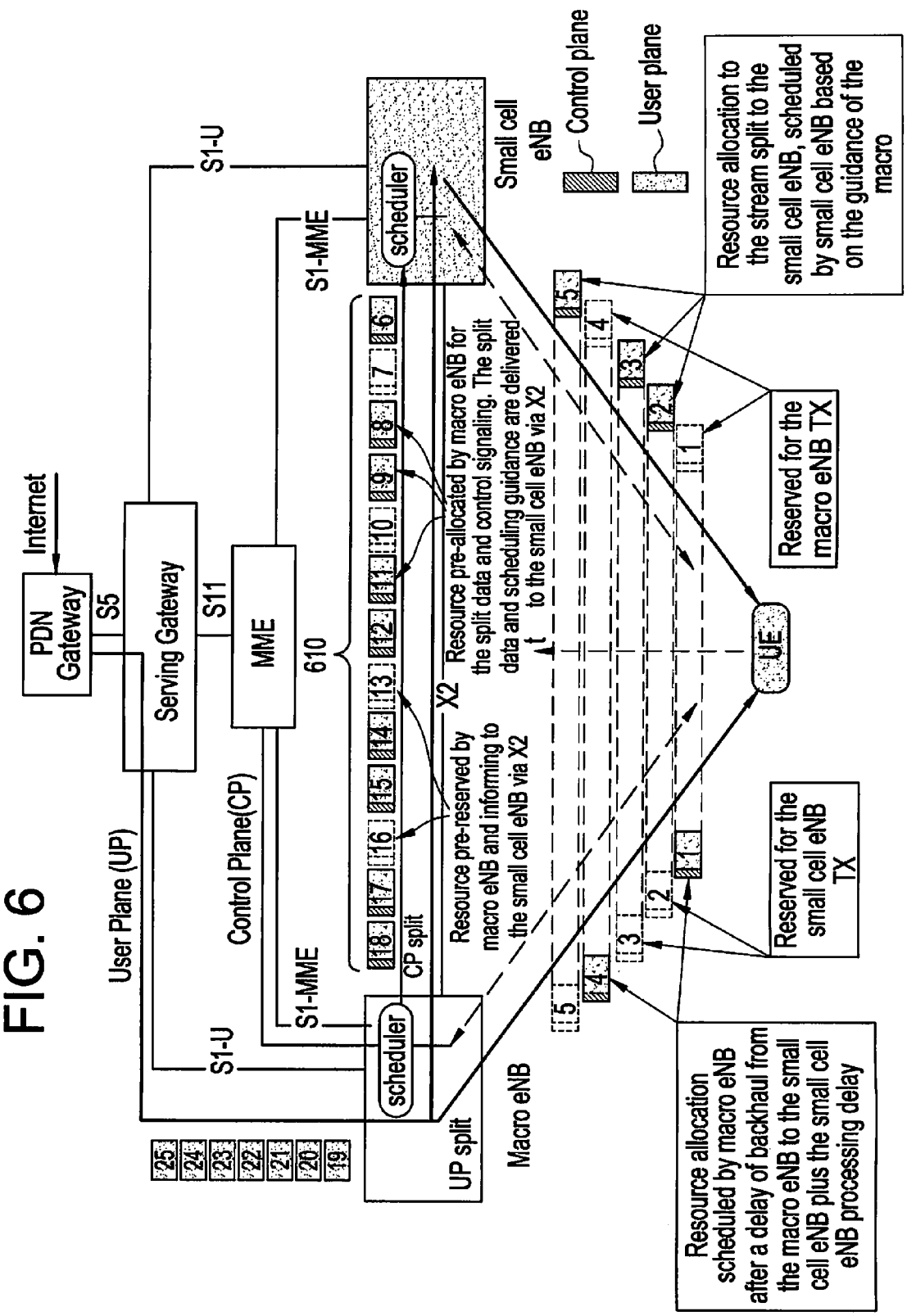

FIG. 6 illustrates an example embodiment of joint scheduling with resource reservation. The example embodiment shown in FIG. 6 is described with the architecture shown in FIG. 4A. However, it should be understood that FIG. 6 is applicable to other architectures, such as those shown in FIGS. 4B and 5A-5B.

The timing of the macro eNB 110₁ and the small cell eNB 125 transmission signals at the small cell coverage area are aligned. The macro eNB 110₁ and small cell eNB 125 are synchronized with the system time. The transmission timing at the small cell eNB 125 may be aligned with macro signals received at the location of the small cell eNB 125. The alignment may be achieved by delaying the transmission timing of the small cell eNB 125 by the radio link propagation delay from the macro eNB 110₁ to the small cell eNB 125.

The X2 (backhaul) delay between the macro eNB 110₁ and the small cell eNB 125 are measured and counted for the alignment of the timing of the TX of both The macro eNB 110₁ and the small cell eNB 125 for multi-streaming. The delay of the backhaul X2 can be measured with known methods. Clocks are maintained at both the macro eNB 110₁ and the small cell eNB 125. At the macro eNB 110₁, after the pre-scheduling is completed, the macro scheduler 450 will start a timer which will expire after the time of X2 backhaul delay plus a small cell eNB 125 processing time. When the timer expires, the macro scheduler 450 will schedule the actual transmission of that pre-scheduled resource block(s), or blank the resource blocks that are transmitted at the small cell eNB 125. At the small cell eNB 125, upon receiving the pre-scheduling information, the small cell scheduler 455 will schedule the real transmission after its pre-determined processing time, or blank the resource block(s) transmitted that are transmitted at the macro eNB $110_1$.

The scheduler 450 transmits pre-scheduling of the stream 425b via the X2 interface to the schedule 455. Using FIG. 6 as an example, the macro eNB $110_1$ transmits pre-scheduling information 610 over the X2 interface. The pre-scheduling information 610 includes the data stream 425b and the control stream 430b. The data stream 425b and the control stream 430b are divided into blocks 6, 8, 9, 11, 12, 14, 15, 17 and 18. The blocks 6, 8, 9, 11, 12, 14, 15, 17 and 18 are resource blocks that are allocated by the macro eNB $110_1$ for the data and control signaling of the data stream 425b and the control stream 430b. Moreover, the macro eNB $110_1$ indicates which resource blocks are pre-reserved by the macro eNB $110_1$ for the data stream 425a and the control stream 430a. The blocks 7, 10, 13 and 16 are resource blocks that are pre-reserved by the macro eNB $110_1$ for the data and control signaling of the data stream 425a and the control stream 430a.

The streams 425a and 425b are pre-scheduled by the scheduler 450 on the resource blocks of different resource block-time-slots (e.g., in 1 ms slots resolution) such that the transmission to the same UE 115 is time multiplexed into two streams 425a and 425b, one from the macro eNB $110_1$ and the other from the small cell eNB 125.

As shown in FIG. 6, the scheduler 450 schedules blocks 1 and 4 for transmission to the UE. Using the pre-scheduled information, the scheduler 455 schedules blocks 2, 3 and 5 for transmission. More specifically, blocks 2, 3 and 5 are blocks allocated to the stream from the macro eNB $110_1$. The blocks are then scheduled by the scheduler 455 based on the pre-scheduling information including the resource blocks and the data rate associated with the resource blocks, and also based on the radio link condition to determine the scheduling parameter settings such as the power allocation of the transmissions. Additionally, blocks 1 and 4 are the blocks indicated by the macro eNB $110_1$ as reserved. Therefore, those blocks are blanked at the small cell eNB 125 and are not to be used for the scheduling of other UEs served by the small cell eNB 125.

The resource (RBs) allocation to the streams 425b and 430b over the period of backhaul delay will be memorized at the macro eNB $110_1$, the macro eNB $110_1$ reserves time slots/resource blocks for the streams 425a and 430, and the macro eNB $110_1$ schedules its transmission after the delay. The scheduler 450 will also avoid use of the resource blocks already scheduled for the streams 425b and 430b transmitted by the small cell eNB 125.

After the resource blocks reserved for the macro eNB $110_1$ arrive at the small cell eNB 125, the small cell eNB 125 will schedule its transmissions avoiding using the resource blocks reserved by the macro eNB $110_1$ for multi-streaming at the cell border.

Similarly, resource blocks scheduled for small cell transmission are pre-allocated by the macro eNB $110_1$. When the small cell eNB 125 starts to transmit with resource blocks, the macro eNB $110_1$ avoids using those resource blocks already occupied by the small cell eNB 125.

In at least one example embodiment, resource blocks reserved/scheduled at the cell edge area (including the pico range extension area) will not be reused by other macro and small cell scheduling. For example, in a pico range extension area, even all the resource blocks (including resources for both data and control) are scheduled by the small cell eNB 125, the resource blocks will not be used by the macro eNB $110_1$ for other scheduling. This will avoid inter-cell interference between the macro and small cells which is caused by the collision of the same resource blocks scheduled by difference cells.

The PDCCH resources for scheduling multi-streaming UE 115 at the cell edge are also pre-reserved and delivered to the small cell eNB 125. The macro eNB $110_1$ determines the PDCCH resources to be used at both the macro eNB $110_1$ and small cell eNB 125 for scheduling the multi-streaming to be used.

In an example embodiment, the scheduling grants and other L1/L2 commands are carried by the Control Channel Elements (CCE) over the PDCCH. The scheduler 450 could pre-allocate the CCEs for scheduling the transmissions at the macro eNB $110_1$ and the small cell eNB 125. The allocation of the CCEs for dual connectivity and multi-streaming is arranged at the macro eNB $110_1$ and delivered to the small cell eNB 125. The macro eNB $110_1$ and small cell eNB 125 use the CCE allocated to them to schedule data transmissions. Similar to the data transmission, those CCEs are blanked for use for transmissions of other UEs. Another example embodiment makes use of ePDCCH (Enhanced Physical Downlink Control Channel). The ePDCCH can be pre-configured over the data resources. The resource allocation for ePDCCH of both the macro and small cell eNBs $110_1$, 125 for dual connectivity transmissions is determined by the macro eNB $110_1$ and delivered to the small cell eNB 125. The scheduler 450 will use the ePDCCH resources allocated to it for its own transmission and will blank the ePDCCH resources allocated to the small cell eNB 125. The scheduler 455 will use the ePDCCH resources allocated to it for its own transmission and will blank the ePDCCH resources allocated to the macro eNB $110_1$.

When the small cell eNB 125 schedules UEs in the small cell, the small cell eNB 125 avoids using the PDCCH resource reserved by the macro eNB $110_1$ for multi-streaming.

The common reference signals may be used in a known method. The UE 115 may cancel the interference between the reference signal from the macro and the reference signals from the pico. The common reference signals are transmitted by the eNBs $110_1$, 125 for the UE 115 to perform measurements. The common reference signals help the 115 UE to maintain the synchronization with the system, to determine the channel conditions and the distance to the eNBs $110_1$, 125.

The small cell eNB 125 and the macro eNB $110_1$ may use same RL ack/nak channel for streams 425a and 425b for reporting to the data source cell.

Since real time scheduling and transmission at both the macro eNB $110_1$ and the small cell eNB 125 have some delay after the resource pre-reservation (as will be described in further detail below), the channel condition maybe changed from the time macro scheduler 450 making pre-reservation. Certain scheduling parameters are set based on the current channel condition. For example, the power allocation may be based on the real time channel condition. It is also possible that the schedulers 450, 455 adjust the modulation scheme based on the real time channel condition.

In an uplink, resource blocks allocated to the small cell eNB 125, may be reused by the macro eNB $110_1$ for UEs a distance greater than a threshold away from the small cell eNB 125.

As described above, the scheduler 450 is aware of the small cell eNB 125 scheduling when scheduling the stream 425a, the scheduler 450 will avoid use of the resource blocks already occupied by the multi-stream for scheduling other UEs within the macro cell. The scheduler 455 is aware of the macro eNB $110_1$ scheduling when scheduling the stream 425b, the scheduler 455 will avoid use of the resource blocks already occupied by the multi-stream for scheduling other local UEs with the small cell. By doing this, the inter-cell interference on the dual connectivity multi-streaming is reduced.

Figure 7:
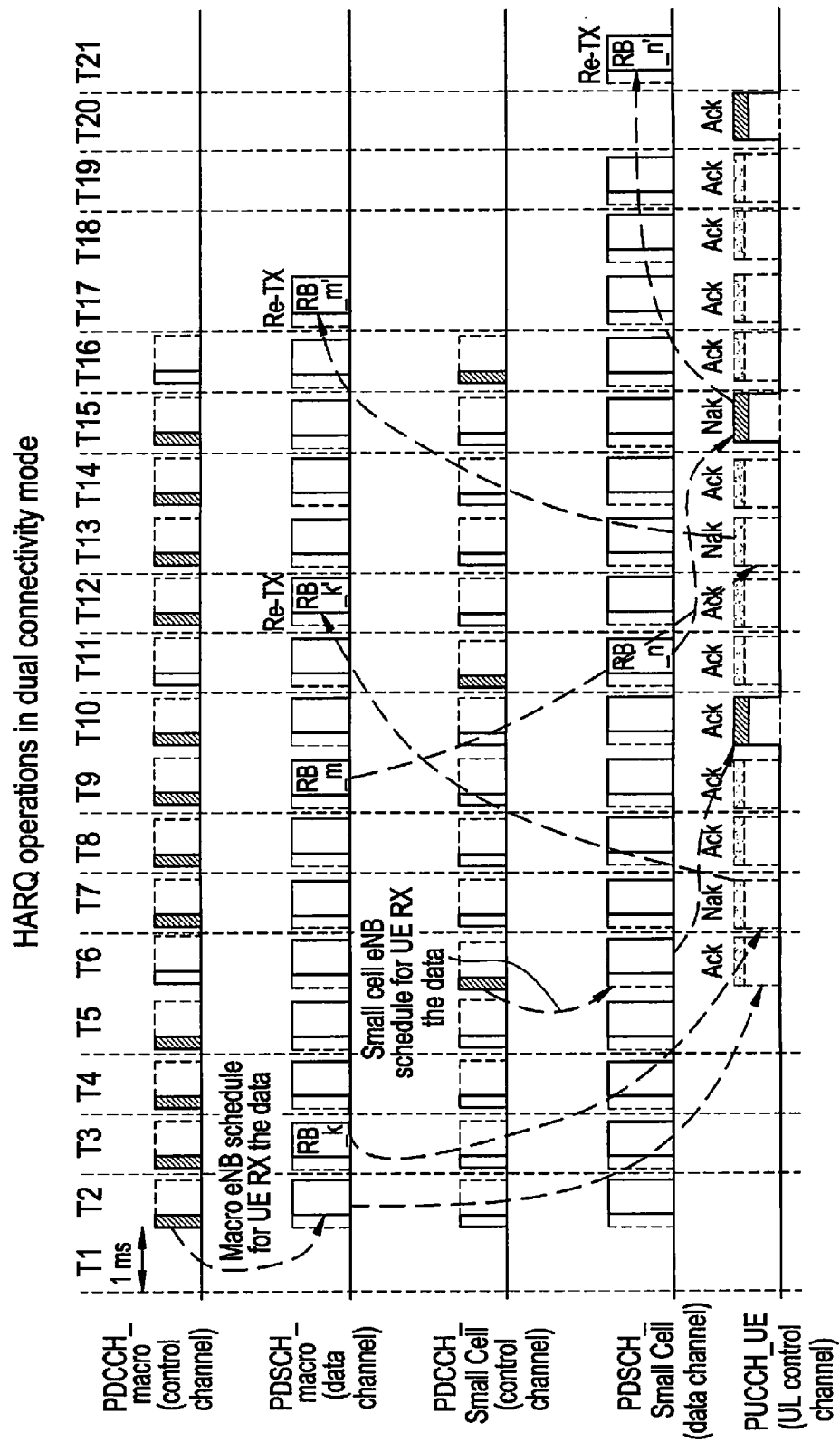

FIG. 7 illustrates a timing diagram of hybrid automatic repeat request (HARQ) according to an example embodiment. The timing diagram shown in FIG. 7 is implemented with pre-reserved resource blocks, as previously described.

The timing diagram is divided into 1 ms time slots $T_1$-$T_{21}$. Each time slot $T_1$-$T_{21}$ may correspond to a resource block allocated to the multi-stream (e.g., streams 425a, 425b, 430a, 430b).

The resource blocks for retransmission are relative to the nak. For example, the retransmission follow the existing retransmission timing specified in the LTE standards. In the timing diagram of FIG. 7, the macro eNB $110_1$ schedules retransmission for a fourth time slot after the nak is transmitted.

The power of an ack will be determined by whether the ack is for macro or pico. In order to overcome a near/far issue, the transmission power of a UE 115 is determined by the distance between the UE 115 and an eNB. For example, a UE is far away from the macro eNB and is close to the pico eNB. High power is used for the UE to transmit ack to the macro eNB. Much lower power is used for the UE to transmit ack to the pico eNB.

A nak's power is boosted by the UE 115 such that both the macro eNB $110_1$ and the small cell 125 are able to decode it.

When a nak is received at the macro eNB $110_1$ and the small cell 125, the eNB that sent the failed resource block(s) will retransmit the resource block at its pre-scheduled resource block. In FIG. 7, the macro eNB $110_1$ transmits data block RB_k which is not properly received by the UE 115. The UE 115 generates a Nak at $T_7$. When the macro eNB $110_1$ receives the Nak, the macro eNB $110_1$ retransmits the data RB_k' at the pre-schedule resource block in time block $T_{12}$. Following the normal retransmission timing (4 slot delay) it should be transmitted at $T_{11}$. Because the small cell 125 is scheduled to transmit data during the time slot $T_{11}$, the macro eNB $110_1$ retransmits the data RB_k' at the next available resource block pre-allocated to the macro eNB $110_1$. In other words, if the retransmission will occur at the time slot where the resource blocks are allocated to the other cell, the next available pre-allocated resource blocks for this eNB will be used for the retransmission.

If the resource blocks allocated to the cell for normal transmissions can be used for retransmission, then those resource blocks (RBs) will be used for retransmission. For example, the macro eNB $110_1$ retransmits the data RB_m' at time slot $T_{18}$ in response to the Nak transmitted in time slot $T_{14}$. Because the small cell 125 is not scheduled to transmit during the time block $T_{18}$, the macro eNB $110_1$ transmits in its allocated resource block.

Macro data and small cell data are transmitted at different time slots, therefore, there is no overlapped data between the macro stream and small cell stream and no ack/nak overlap.

Figure 8:
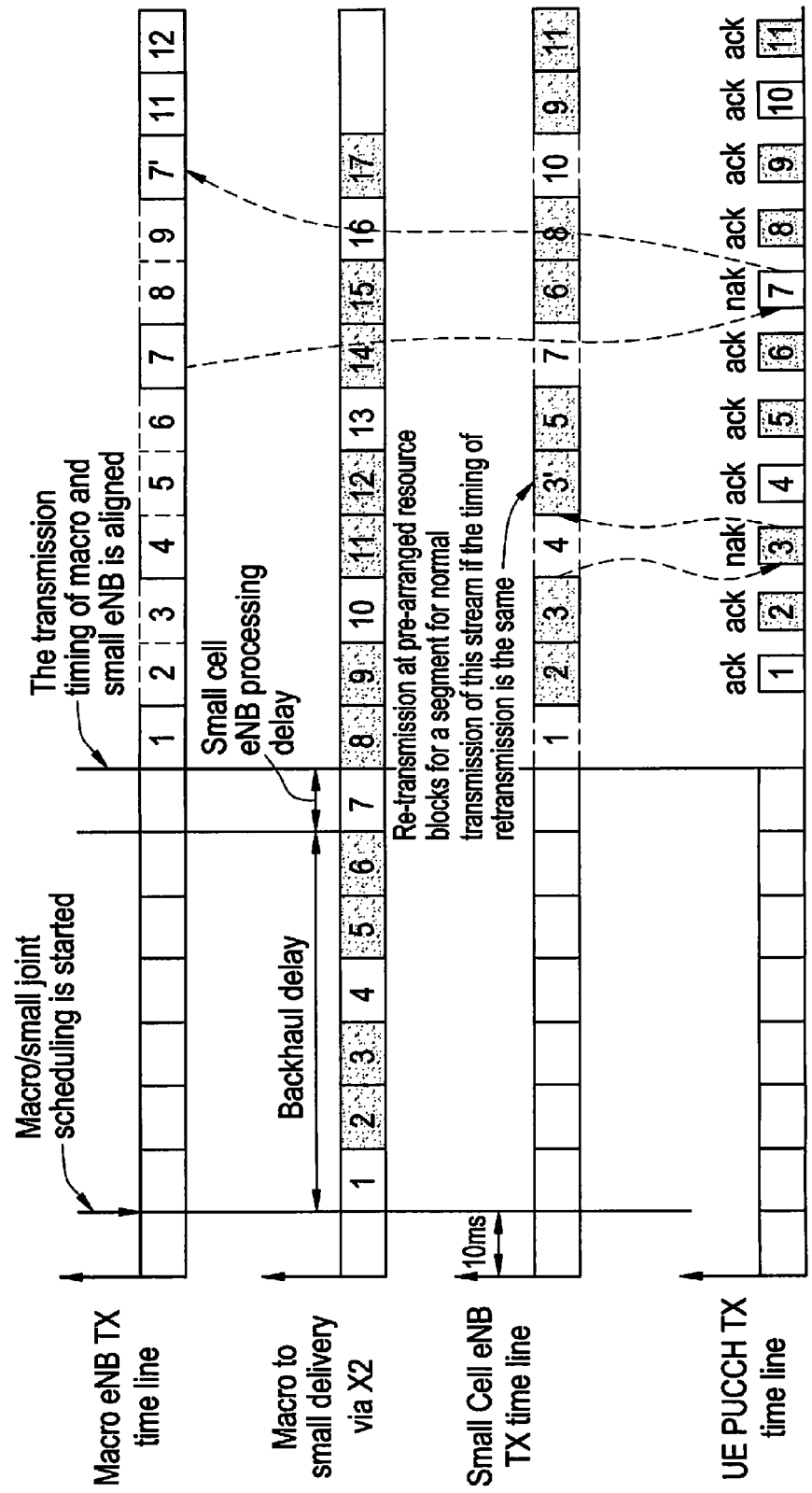

FIG. 8 illustrates a timing diagram of RLC ARQ according to an example embodiment. The timing diagram shown in FIG. 8 is implemented with pre-reserved resource blocks, as previously described.

The segmentation is conducted at the RLC layer. The size of the segmentation is determined at the RLC layer based on different factors such as the type of the application. Each segment is assigned a sequence number for supporting the RLC re-ordering operations. After the segmentation is conducted, the size of a segment can be determined. Based on the size of a segment, determine resource blocks for re-transmitting. A segment for retransmission may be further divided into sub-segments depending on the RBs available at the MAC layer.

As shown in FIG. 8 as an example, the macro eNB $110_1$ transmits pre-scheduling information to the small cell eNB 125. The pre-scheduling information includes the information in streams 425b and 430b. Moreover, the small cell eNB 125 has a delay to process the pre-scheduling information.

When a nak is received at the eNBs, if the eNB is the one sent the failed data segment, it will retransmit the segment at the pre-allocated resource blocks and if the eNB is not the one sent the failed data segment, it will bar the use of those resource blocks for any other scheduling.

If the resource blocks allocated to the cell for normal transmissions can be used for retransmission, then those resource blocks (RBs) will be used for retransmission. For example, the small cell eNB 125 receives a negative acknowledgement for its data segment 3. Since the small cell eNB 125 is allocated the next segment, the small cell 125 retransmits the data segment 3'.

Otherwise, if the retransmission will occur at the time slot where the resource blocks are allocated to the other cell, the next available resource segment(s) pre-allocated to this eNB will be used for the retransmission. For example, the macro eNB $110_1$ receives a nak for its data 7. Since the small cell eNB 125 is allocated the next segment, the macro eNB $110_1$ transmits on the next available resource blocks pre-allocated for macro eNB.

Figure 9A:
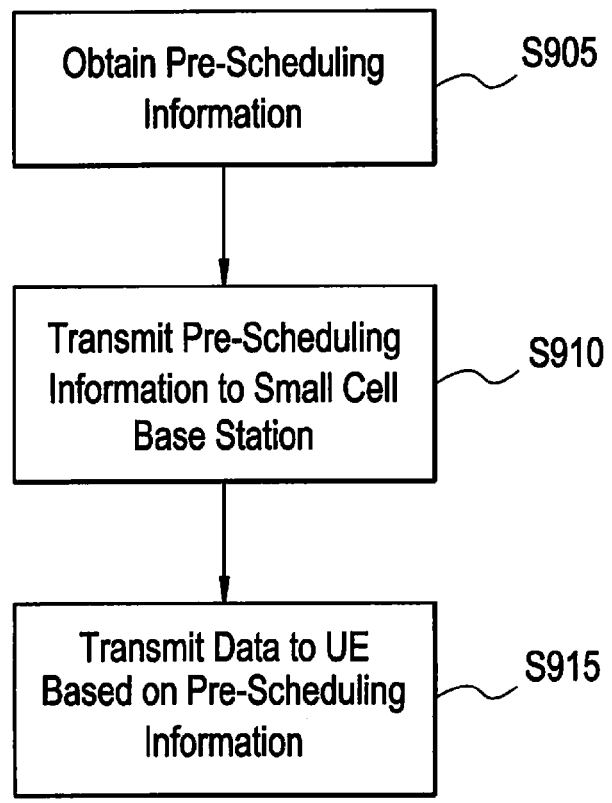
FIG. 9A illustrates a method of scheduling communications for a UE in a co-channel heterogeneous network having a macro cell base station and small cell base station according to an example embodiment.

FIG. 9A illustrates a method of scheduling communications for a UE in a co-channel heterogeneous network having a macro cell base station and small cell base station. The method of FIG. 9A may be performed by the macro eNB $110_1$ and implemented in accordance with example embodiments described with reference to FIGS. 4A-8. The method of FIG. 9A is not illustrated to the steps shown in FIG. 9A. For example, the example embodiments described with reference to FIGS. 4A-8 may be implemented in FIG. 9A.

At S905, the macro eNB $110_1$ obtains pre-scheduling information for transmissions to the UE based on measurements from the UE. The measurements may include a location of the UE and channel conditions between the UE and the macro cell base station and channel conditions between the UE and the small cell base station. For example, in FIGS. 4A-4B, the macro eNB $110_1$ anchors the user plane 425 and the control plane 430. Based on at least one of the location of the UE 115 and the received link measurements/channel quality indicators (CQI), the macro eNB $110_1$ decides whether to enter or exit a dual connectivity mode, controls the percentage user plane splitting (adjusts data to be send to the small cell eNB 125) and pre-schedules resource block allocation for both the macro eNB $110_1$ and small cell eNB 125. As such, the macro cell base station, allocates resource blocks for transmissions to the UE.

At S910, the macro cell base station transmits the pre-scheduling information to the small cell base station. For example, the resource (RBs) allocation to the streams 425b and 430b over the period of backhaul delay will be memorized at the macro eNB $110_1$, the macro eNB $110_1$ reserves time slots/resource blocks for the streams 425a and 430, and the macro eNB $110_1$ will be schedules its transmission after the delay. After the resource blocks reserved for the macro eNB $110_1$ arrive at the small cell eNB 125, the small cell eNB 125 will schedule its transmissions avoiding using the resource blocks reserved by the macro eNB $110_1$ for multi-streaming at the cell border.

The macro cell base station may split the data into first and second data streams and transmit the second data stream to the small cell base station. The macro cell base station may split the data based on a channel condition, buffer condition and data rate and allocates a first portion of the data to the first data stream and a second portion of the data to the second data stream based on the channel condition, buffer condition and data rate.

At S915, the macro cell base station transmits data to the UE based on the pre-scheduling information. More specifically, the macro cell base station transmits data to the UE using the resource blocks allocated to the macro cell base station.

Figure 9B:
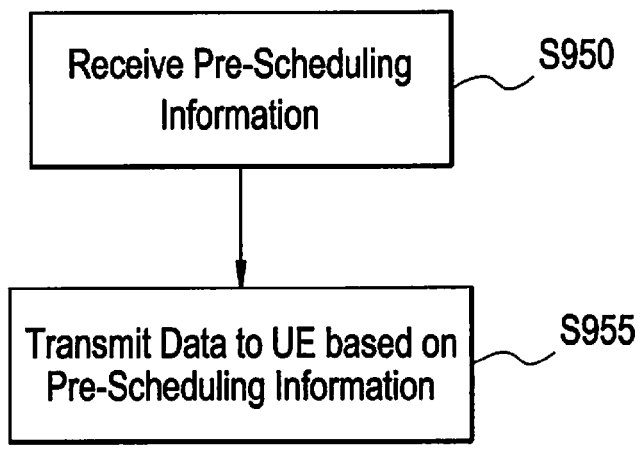
FIG. 9B illustrates a method of scheduling communications for a UE in a co-channel heterogeneous network having a macro cell base station and small cell base station according to an example embodiment.

FIG. 9B illustrates a method of scheduling communications for a UE in a co-channel heterogeneous network having a macro cell base station and small cell base station. The method of FIG. 9B may be performed by the small cell eNB 125 and implemented in accordance with example embodiments described with reference to FIGS. 4A-8. The method of FIG. 9B is not illustrated to the steps shown in FIG. 9B. For example, the example embodiments described with reference to FIGS. 4A-8 may be implemented in FIG. 9B.

At S950, the small cell base station receives pre-scheduling information from the macro cell base station. The pre-scheduling information indicates first resource blocks for first transmissions from the macro cell base station and second resource blocks for second transmissions from the small cell base stations. For example, the small cell base station receives the pre-scheduling information 610.

Based on channel condition, buffer condition and data rate, the small cell base station schedules transmissions to the UE using the allocated resource blocks.

As S955, the small cell base station transmits the data to the UE based on the scheduling.

Figure 10A:
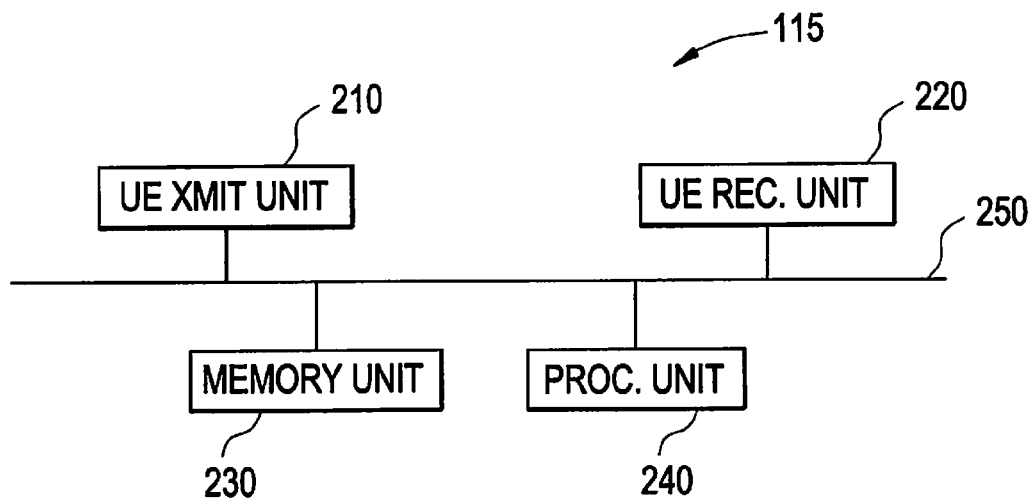
FIG. 10A illustrates an example embodiment of a UE shown in FIG. 1.

FIG. 10A illustrates an example embodiment of the UE 115. It should be also understood that the UE 115 may include features not shown in FIG. 10A and should not be limited to those features that are shown.

The UE 115 is configured to determine channel conditions, speed and location information.

The UE 115 may include, for example, a transmitting unit 210, a UE receiving unit 220, a memory unit 230, a processing unit 240, and a data bus 250.

The transmitting unit 210, UE receiving unit 220, memory unit 230, and processing unit 240 may send data to and/or receive data from one another using the data bus 250. The transmitting unit 210 is a device that includes hardware and any necessary software for transmitting wireless signals on the uplink (reverse link) including, for example, data signals, control signals, and signal strength/quality information via one or more wireless connections to other wireless devices (e.g., base stations).

The UE receiving unit 220 is a device that includes hardware and any necessary software for receiving wireless signals on the downlink (forward link) channel including, for example, data signals, control signals, and signal strength/quality information via one or more wireless connections from other wireless devices (e.g., base stations). The UE receiving unit 220 receives information from the serving base station 110₁ and the small cell eNB 125.

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code.

Figure 10B:
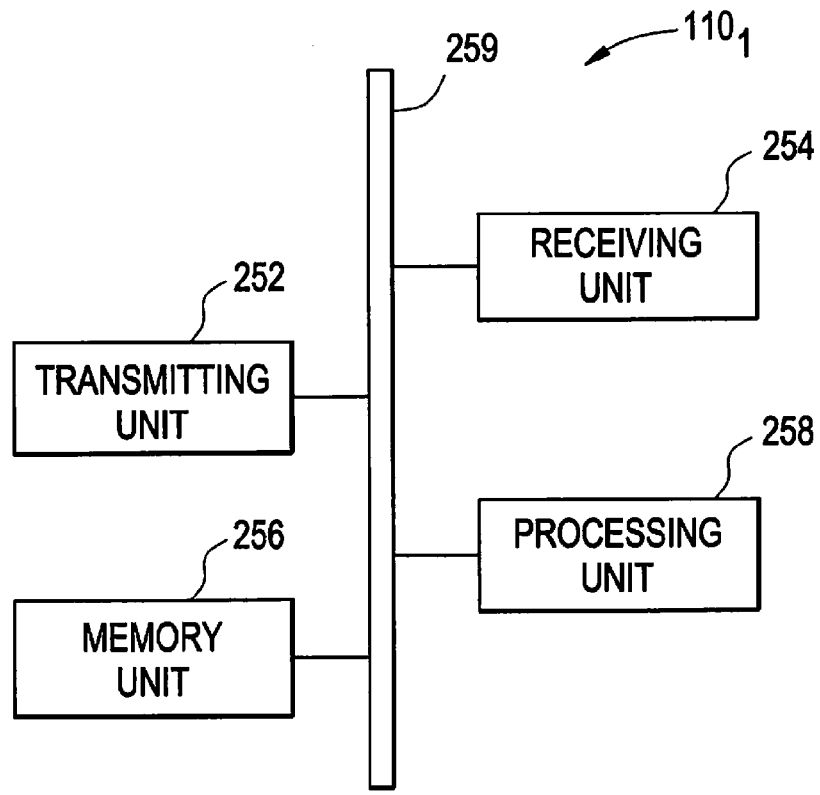

FIG. 10B illustrates an example embodiment of the macro eNB 110₁. It should be also understood that the macro eNB 110₁ may include features not shown in FIG. 10B and should not be limited to those features that are shown.

Referring to FIG. 10B, the base station 110₁ may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the wireless communications network 100.

The receiving unit 254 is a device that includes hardware and any necessary software for receiving wireless signals including, for example, data signals, control signals, and signal strength/quality information via one or more wireless connections to other network elements in the network 100.

The memory unit 256 may be any device capable of storing data including magnetic storage, flash storage, etc. The memory unit 256 is used for data and controlling signal buffering and storing for supporting pre-scheduling and the scheduled data transmissions and re-transmissions.

The processing unit 258 may be any device capable of processing data including, for example, a microprocessor configured to carry out specific operations based on input data, or capable of executing instructions included in computer readable code.

For example, the processing unit 258 is capable of determining a speed of the UE and controlling a HO from the serving base station to a second base station based on the speed of the UE, as described above. Furthermore, the processing unit 258 is configured to perform the calculations of the macro eNB 110₁ that are described with reference to FIGS. 1-9A.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of scheduling communications for a user equipment (UE) in a co-channel heterogeneous network having a macro cell base station and a small cell base station, the method comprising:
    obtaining, by the macro cell base station, pre-scheduling information for transmissions to the UE based on measurements from the UE, the obtaining including,
        allocating resource blocks for the transmissions, the transmissions to the UE being from at least one of the macro cell base station and the small cell base station over the co-channel network;
    transmitting, by the macro cell base station, the pre-scheduling information to the small cell base station, the pre-scheduling information indicating first resource blocks for first transmissions from the macro cell base station and second resource blocks for second transmissions from the small cell base station;
    scheduling, by the macro cell base station, the first transmissions based on the pre-scheduling information and separate from scheduling by the small cell base station; and transmitting, by the macro cell base station, a first data stream for the UE based on the scheduled first transmissions.

2. The method of claim 1, further comprising:
transmitting a second data stream to the small cell base station based on the pre-scheduling information.

3. The method of claim 2, further comprising:
receiving, by the macro cell base station, the first data stream based on a first link measurement of a first link between the UE and the macro cell base station and a second link measurement of a second link between the UE and the small cell base station, wherein the first link measurement is at least one of a channel condition, buffer condition, loading of the macro and small cell base stations, a location of the UE, a speed of the UE and data rate.

4. The method of claim 2, further comprising:
determining an order of the first transmissions from the macro cell base station and the second transmissions from the small cell base stations.

5. The method of claim 2, further comprising:
generating, by the macro cell base station, controlling and the pre-scheduling information;
splitting the controlling and the pre-scheduling information into first and second control streams;
transmitting the second control stream and control channel resource arrangement to the small cell base station; and
transmitting the first control stream to the UE based on the pre-scheduling information.

6. The method of claim 1, further comprising:
generating, by the macro cell base station, controlling and the pre-scheduling information;
splitting the controlling and the pre-scheduling information into first and second control streams;
transmitting the second control stream to the small cell base station over a backhaul; and
transmitting the first control stream to the UE based on the pre-scheduling information.

7. The method of claim 1, wherein the scheduling schedules the first transmissions based on the pre-scheduling information and conditions of a channel between the UE and the macro cell base station.

8. The method of claim 1, further comprising:
receiving, by the macro cell base station, a second data stream for the UE; and
transmitting at least most of the second data stream to the small cell base station over a backhaul based on a measurement of a small cell reference signal reported by the UE.

9. The method of claim 8, further comprising:
receiving, by the macro cell base station, signaling information;
transmitting the signaling information to the small cell base station over a backhaul when a location of the UE is in a small cell coverage area including a small cell range extension area and central area of the small cell.

10. The method of claim 1, wherein the transmitting transmits the first data stream for the UE in coordination with a second data stream from the small cell base station based on the pre-scheduling information.

11. The method of claim 10, further comprising:
receiving one of an acknowledgement and negative acknowledgement from the UE over an uplink channel, the uplink channel being used by the macro cell base station and the small cell base station to receive information from the UE.

12. The method of claim 11, further comprising:
retransmitting the first data in response to a negative acknowledgement using one of the first resource blocks.

13. The method of claim 1, further comprising:
blocking transmissions in the second resource blocks.

14. The method of claim 1, wherein the obtaining obtains the pre-scheduling information based on a backhaul delay between the macro cell base station and the small cell base station and an information processing delay of the small cell base station.

15. A method of scheduling communications for a user equipment (UE) in a co-channel heterogeneous network having a macro cell base station and a small cell base station, the method comprising:
receiving, by the small cell base station, pre-scheduling information from the macro cell base station, the pre-scheduling information indicating first resource blocks for first transmissions from the macro cell base station over the co-channel network and second resource blocks for second transmissions from the small cell base stations over the co-channel network;
receiving, by the small cell base station, data for the UE from a serving gateway of the network;
scheduling, by the small cell base station, the second transmissions based on the pre-scheduling information and separate from scheduling by the macro cell base station; and
transmitting the data to the UE based on the scheduling.

16. The method of claim 15, further comprising:
receiving, by the small cell base station, signaling information from the macro cell base station; and
transmitting the signaling information to the UE based on the pre-scheduling information.

17. The method of claim 16, further comprising:
receiving, by the small cell base station, data for the UE from the macro cell base station; and
transmitting the data from the macro cell to the UE based on the pre-scheduling information.

18. The method of claim 17, wherein the transmitting is based on a delay allowed for the small cell base station to processing the received pre-scheduling information over the backhaul.

19. The method of claim 17, further comprising:
receiving one of an acknowledgement and negative acknowledgement from the UE over a control channel, the channel being used by both the macro cell base station and the small cell base station to receive responses from the UE.

20. The method of claim 19, further comprising:
transmitting a response to the one of the acknowledgement and negative acknowledgement using one of the second resource blocks.

21. The method of claim 15, further comprising:
blocking transmissions in the first resource blocks.

* * * * *